(12) United States Patent
Belleville

(10) Patent No.: US 6,680,080 B1
(45) Date of Patent: Jan. 20, 2004

(54) METHOD FOR ANTIGLARE TREATMENT AND MATERIAL HAVING ANTIGLARE PROPERTIES

(75) Inventor: Philippe Belleville, Tours (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/581,050

(22) PCT Filed: Dec. 8, 1998

(86) PCT No.: PCT/FR98/02659
§ 371 (c)(1),
(2), (4) Date: Aug. 31, 2000

(87) PCT Pub. No.: WO99/30188
PCT Pub. Date: Jun. 17, 1999

(30) Foreign Application Priority Data

Dec. 9, 1997 (FR) ............................................. 97 15547

(51) Int. Cl.⁷ ............................. B05D 5/06; B32B 31/24
(52) U.S. Cl. ....................... 427/165; 427/169; 427/168; 427/389.7
(58) Field of Search ............................. 427/389.7, 165, 427/168, 169; 359/601, 614; 428/336, 421, 422, 426

(56) References Cited

U.S. PATENT DOCUMENTS

| | | | | |
|---|---|---|---|---|
| 4,048,515 A | * | 9/1977 | Liu | 307/88.3 |
| 4,363,852 A | * | 12/1982 | Nakajima et al. | 428/432 |
| 5,139,879 A | | 8/1992 | Aharoni et al. | 428/422 |
| 5,449,558 A | | 9/1995 | Hasegawa et al. | 428/422 |
| 5,853,662 A | * | 12/1998 | Watanabe | 422/40 |

FOREIGN PATENT DOCUMENTS

| | | |
|---|---|---|
| EP | 0 564 134 A2 | 3/1993 |
| FR | 2 680 583 | 8/1991 |

* cited by examiner

Primary Examiner—Ramsey Zacharia
(74) Attorney, Agent, or Firm—Anderson Kill & Olick; Eugene Lieberstein; Michael N. Meller

(57) ABSTRACT

This invention relates to a method of antiglare treatment of an organic or inorganic substrate, particularly, sensitive to temperature increases such as phosphate substrates and to a material having antiglare properties that can be obtained by the method of the invention. The invention method comprises a step of deposition a layer of a fluorinated polymer with a low refractive index onto the substrate from a deposition solution that includes said fluorinated polymer. The invention method can be applied to the manufacture of a pockels cell.

7 Claims, 1 Drawing Sheet

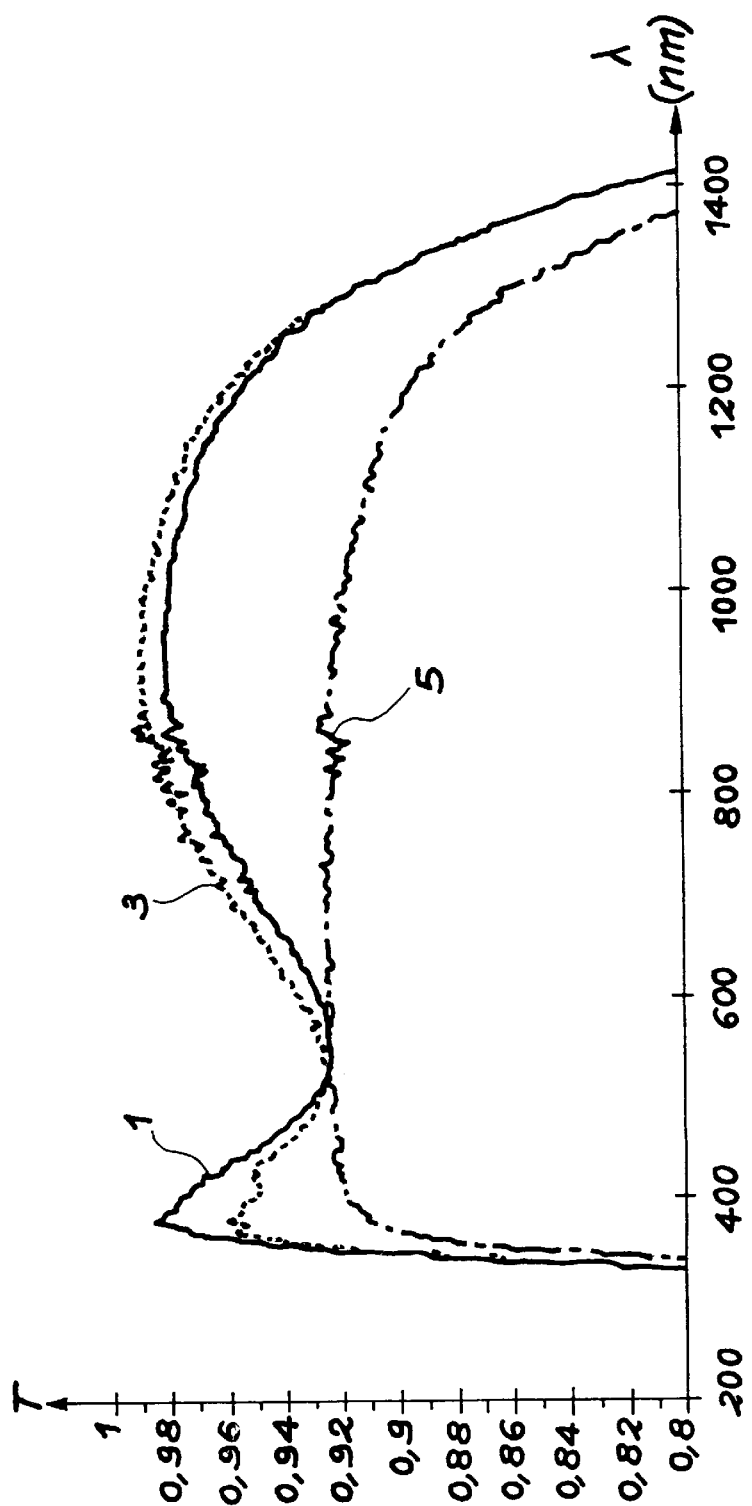

METHOD FOR ANTIGLARE TREATMENT AND MATERIAL HAVING ANTIGLARE PROPERTIES

TECHNOLOGICAL FIELD

This invention relates to a method of antiglare treatment of an organic or inorganic substrate, and to a material having antiglare properties that can be obtained by the method of the invention.

In the description that follows, the term organic substrate designates, more precisely, a plastic substrate, for example, one chosen from among the polyacrylates, polycarbonates, polyallylcarbonates and polyamides. In any case, this list is not limitative and covers polymeric materials in a more general way.

The term inorganic substrate covers, more precisely, a vitreous substrate, that is to say, for example, an amorphous or even a crystalline material and, in particular, a silica based glass such as silicate glass, a borosilicate glass, a sodium/calcium glass, and a phosphate based glass, such as a fluorophosphate substrate, and a phosphate substrate, for example, a crystal of potassium dihydrogen phosphate ($KH_2PO_4$ or KDP) which may or may not be deuterated.

The method of the invention is particularly advantageous for treating a substrate sensitive to increases in temperature such as a phosphate substrate.

Phosphate substrates, for example a crystal of potassium dihydrogen phosphate, find application, for example, in the fields of laser amplification, laser frequency conversion or in the manufacture of Pockels cells.

Phosphate substrates are very sensitive to thermal shocks. For example, crystals of deuterated KDP undergo an irreversible crystal phase transition at a temperature which is lower the more strongly deuterated they are. The antiglare treatment of these substrates must, as a consequence, be carried out at a moderate temperature or indeed at ambient temperature.

Furthermore, phosphate substrates are fragile and are damaged by atmospheric humidity. In effect, in the presence of moisture, they are hydrolyzed on the surface and become opaque, thereby losing their optical properties. These substrates must, as a consequence, be protected from moisture.

The method of the invention is also applicable, for example, to a silica based glass, and to the organic or inorganic substrates previously described, that is to say, particularly to plastic substrates and to vitreous substrates.

These substrates are also referred to below as "material having antiglare properties". They find numerous applications. These applications are for example in the field of high power lasers, solar, thermal and photovoltaic applications, integrated optical systems and in architectural applications such as panels glazed on the outside. In the field of solar applications, vitreous or plastic substrates are already used in optical systems in order to minimize heat losses, to concentrate and to focus light energy and finally to protect certain absorbent components.

To summarize, the antiglare treatment which allows one to increase optical transmission, can in certain cases enable one to increase the life of the substrate by an effect of protecting it against humidity. It must in addition, be resistant to a laser flux when it is to be used in laser applications, and must be produced at a temperature that is compatible with the thermal fragility of the substrate.

The invention also relates to a material having antiglare properties that can be obtained by the method of the invention, for example, to a doubly refracting crystal.

STATE OF THE ART

Patent application FR-A-2 680 583 describes an antiglare treatment for organic or inorganic substrates. This treatment is a method of the sol-gel type which uses a dense layer of alkylsilicone resin as a protector for the substrate and a porous sol-gel film as an antiglare layer, and which includes a heat treatment at 150° C. or 180° C.

This method does not allow one to treat substrates sensitive to temperature increases. Also, a compromise is always necessary to the detriment of the protective function against moisture, for example, an antiglare sol-gel deposit, without a silicone layer in the case of deuterated KDP crystals.

DISCLOSURE OF THE INVENTION

The precise purpose of this invention is to provide a method of antiglare treatment for an organic or inorganic substrate that allows one to increase the optical transmission through said substrate and to increase the life of said substrate by protecting it against moisture.

The organic or inorganic substrates are, for example, those described previously.

The method of the invention comprises a step of depositing a layer of fluorinated polymer with a low refractive index, onto said substrate.

According to the invention, the deposition of the layer of fluorinated polymer can be carried out from a deposition solution comprising the fluorinated polymer and a perfluorinated solvent using a technique which can be chosen from a dipping-withdrawing technique, a centrifugal coating technique or a laminar coating technique.

The dipping-withdrawing technique consists of immersing the substrate in a deposition solution and removing it from this solution to leave it to dry. The centrifugal coating technique consists of depositing the deposition solution on the substrate which is rotating. The laminar coating technique consists of coating the substrate horizontally by capillarity using a tube containing the deposition solution. This technique is the subject of patent application FR-A-2 693 558 assigned to the CEA.

The method can be carried out at ambient temperature, and it can be carried out under atmospheric pressure.

The layer of fluorinated polymer is preferably deposited in the form of a thin film, uniformly distributed over the substrate.

The preferred fluorinated polymer according to the method of the invention is an organic fluorinated polymer having a low refractive index, within a range of values from about 1.2 to about 1.4, preferably about 1.3 and preferably soluble in most perfluorinated solvents at ambient temperature.

The organic fluorinated polymer may, for example, be a derivative of polytetrafluoroethylene which may be at a concentration of from 0.1 to 10% by weight in the deposition solution. This polymer may be, for example, an amorphous copolymer arising from a copolymerization of a perfluoro alkene with a perfluoro dioxole. An example of such a polymer is the copolymer with the name TEFLON AF (registered trade mark) arising from the copolymerization of a mixture of tetrafluoroethylene (TFE) and 2,2-bistrifluoromethyl-4,5-difluoro-1,3-dioxole (PDD). The PDD sterically prevents the crystallization of the polymer formed. According to the PDD content in the mixture, the properties of the resultant copolymer vary. Hence, when the concentration of PDD increases, the solubility of the copolymer decreases, the refractive index decreases and its vitreous transition temperature increases.

CYTOP (trade mark) is another example of a fluorinated polymer which can be used in the method of the invention. It is sold by Asahi Glass Company and its particular features are a great facility for use in coating, good transparency in the visible and ultraviolet, a low refractive index, approximately equal to 1.34 and good chemical and thermal resistance. Its chemical composition has not been disclosed.

The perfluorinated solvent can be chosen from the group including a perfluoro-alkylamine, for example, Fluorinert series FC (registered trade mark) from the company 3M, a perfluoro-polyether, for example, the Galden series HT or DO (registered trade mark) from the company Ausimont-Montedison, a fluoro-alkane such as Freon, and Flutec (registered trade mark) from the company Rhône-Poulenc.

The deposition solution is prepared by mixing a suitable quantity of a fluorinated polymer with a perfluorinated solvent to obtain a deposition solution having a viscosity that permits a uniform and homogeneous deposition on the surface of the substrate.

This viscosity is a function of the concentration of the fluorinated polymer in the deposition solution. Also, according to the method of the invention, when the fluorinated polymer is, for example, a derivative of polytetrafluoroethylene (PTFE) and the perfluorinated solvent is a perfluoro-alkylamine, its concentration is preferably from 0.5 to 10% by weight of fluorinated polymer in the deposition solution, more preferably from 0.5 to 6% and even more preferably from 2 to 6% by weight.

Preferably, the deposition solution is filtered before deposition onto the substrate, using a filter compatible with the nature of the solvent and of the fluorinated polymer, for example using a polypropylene filter of the Whatman (registered trade mark) type in a way that removes impurities that may be in suspension in this solution and hence improve the quality of the antiglare treatment.

According to the method of the invention, the layer of fluorinated polymer deposited on the substrate may be deposited in a single coat, or in several coats, that is to say in one or more successive applications.

The layer, or film of fluorinated polymer may be deposited in a layer the thickness of which is a function of the spectral field of use and preferably corresponds to that of a quarter wave optical layer.

According to the invention, when the fluorinated polymer has a refractive index n and permits an end transmission of light at wavelength λ, the layer of fluorinated polymer is deposited to a thickness $$e = \frac{\lambda}{4n}.$$

The layer of deposited fluorinated polymer preferably has a thickness within the range 50 to 300 nm for the ultraviolet-near infrared, that is to say 260 nm≦λ≦1560 particularly when the fluorinated polymer is a derivative of polytetrafluoroethylene.

In the example of the derivative of polytetrafluoroethylene, this thickness is easily deposited in a single application when the concentrations of the solutions used is taken into account.

The method of this invention is of particular interest for an antiglare treatment of a substrate sensitive to temperature increases, for example, an antiglare treatment of a phosphate glass, or a crystal of KDP whether deuterated or not.

However, this method is also of interest, for example, for an antiglare treatment of a silicate glass, a sodium/calcium glass or a borosilicate glass.

So as to improve the adherence of the antiglare layer to the substrate, the method of the invention can additionally comprise preparation of the surface of the substrate, before the step of deposition onto the substrate of a layer of fluorinated polymer of low refractive index.

This preparation consists of cleaning the substrate. The cleaning is carried out using solvents and products that are traditionally used for the cleaning and the rinsing of substrates for optical work. These solvents and products are preferably suitable for the kind of substrate so it is not damaged.

For example, when the substrate is a hygroscopic phosphate substrate, a hydrocarbon arising from the distillation of petroleum can be used as a solvent for basic cleaning and/or degreasing. This solvent can for example, be toluene or kerosene. The substrate can then be rinsed with an alcoholic or aromatic hydrocarbon for fine cleaning of the surface and then by a chlorinated organic solvent such as tetrachloro-ethylene.

For example, when the substrate is a silica based glass, one can use water, acetone, ethanol, an acid such as hydrofluoric acid diluted to 0.5% by mass, and optical soap to clean the substrate.

Cleaning of the silicate substrate may, for example, include the successive steps of rinsing with water, washing with acetone, washing with ethanol, washing with hydrofluoric acid diluted to 0.5% by mass, rinsing with water, washing with optical soap, rinsing with water and rinsing with ethanol.

The preparation of the substrate can be terminated by drying of the substrate in the open air or by wiping it using a cloth of optical quality and a compatible clean room, and/or soft absorbent optical paper. The cloth of optical quality is for example, a continuous thread Nylon 66 fabric (commercial brand) and the soft optical paper is for example, a paper made of non-woven cellulose fibers.

Once cleaned, rinsed and dried, the substrate can be subjected to the method of deposition of the layer of fluorinated polymer according to the invention. In the case of a substrate intended for optical applications, the deposition of the layer of fluorinated polymer is preferably carried out in a clean room, that is to say in an environment in which the amount of dust in suspension in a specific volume is controlled. A class 1000 clean room, that is to say a room including less than 35300 particles, of mean diameter 0.5 μm, in suspension per cubic meter of air (1000 particles of mean diameter 0.5 μm in suspension per cubic foot of air), is suitable for such a deposition.

Once deposited on the substrate, the layer or film of fluorinated polymer can be dried at ambient temperature or slightly above, but it does not require any supplementary chemical or physical treatment.

According to a variant of the method of the invention, when the substrate is a substrate that is not sensitive to a heat treatment, for example a silica based glass, the method of the invention can additionally comprise, before the step of depositing a layer of fluorinated polymer of low refractive index onto said substrate, a step consisting of coating the surface of said substrate with a layer of coupling agent.

This step which consists of coating the substrate with a layer of a coupling agent can then follow the preparation of the substrate previously described.

According to this variant, the coupling agent can be perfluoro-alkylalkoxy-silane, perfluoro-alkylchloro-silane, a derivative of these compounds or of their derivative. A solution of this coupling agent can be prepared in an alcoholic medium to coat the substrate, for example, in butanol, preferably at a coupling agent concentration of 2% by weight at the most.

Preferably, the alcohol/coupling agent mixture is catalyzed by the addition of an acid, for example a mineral acid, until a low pH is obtained, that is to say a pH ranging from 6 to 3. An example of such an acid is hydrochloric acid.

The substrate can be coated with this solution of a coupling agent using the usual solution coating techniques at ambient temperature, for example by a dipping-withdrawing, centrifugal coating or laminar coating technique.

The coupling agent coating must not have too great a thickness, preferably less than 0.03 $\mu$m, so that it does not interfere with the resulting optical response; the optical properties of the resultant film (transmission, reflection) are identical or substantially identical with or without a coupling agent.

After drying this coating, the substrate coated in this way with a coupling agent can be subjected to a heat treatment at a temperature of about 100 to 200° C., preferably at about 120° C., which increases the adhesion of the fluorinated polymer which will be deposited on this coating on the substrate.

Subsequently, the solution of fluorinated polymer, previously described, can be deposited on the substrate coated with the coupling agent, in accordance with the method of the invention.

The coupling agent reinforces the adhesion of the layer of fluorinated polymer to the silica based substrate.

After deposition of the fluorinated polymer, said coated substrate can be subjected to a subsequent heat treatment at a temperature of between 100 and 300° C. to reinforce the adhesive properties.

The layer, or film of fluorinated polymer, obtained according to the method of the invention, is dense, whatever the substrate, and hydrophobic and it forms a good protective barrier for the substrate against moisture and against possible splashing of solvent.

This layer has the advantage that it can be wiped without being damaged and can easily be removed from the surface of the substrate by chemical cleaning, for example by using a perfluorinated solvent and/or an aqueous solution of hydrofluoric acid, without having recourse to polishing the surface.

Another advantage of the method of this invention is that it also permits antiglare treatment of soft and thermally fragile substrates.

Another advantage of the method of this invention is that it permits antiglare treatment of a substrate in a single monolayer deposition, without subsequent heat treatment, and at an ambient temperature and at atmospheric pressure.

The method of the invention may also be applied, for example, to KDP crystals used for frequency conversion in laser chains.

The invention also relates to a material having antiglare properties comprising a substrate of an organic or inorganic nature and a layer of a fluorinated polymer with a low refractive index deposited on the surface of said substrate.

The substrate and the fluorinated polymer are those described previously.

The material according to the invention can additionally comprise a layer of coupling agent between the surface of the substrate and the layer of fluorinated polymer. This layer of coupling agent may be that described previously.

When the fluorinated polymer has a refractive index n and permits an end transmission of light at wavelength $\lambda$, the layer of fluorinated polymer is deposited to a thickness $$e = \frac{\lambda}{4n}.$$

The refractive index of the fluorinated polymer is preferably within a range of values from about 1.2 to about 1.4, preferably this refractive index is about 1.3.

The layer of fluorinated polymer preferably has a thickness within a range of values from 50 to 300 nm for the ultra-violet, near infra-red range, that is to say notably when the fluorinated polymer is a derivative of polytetrafluoroethylene, $260 \leq \lambda \leq 1560$ nm.

Furthermore, when the substrate is a crystal of potassium dihydrogen phosphate which may or may not be deuterated, the material according to the invention consists of a doubly refracting crystal which can be used for the manufacture of a Pockels cell. The use of this coating enables one to simplify considerably the operation and the maintenance of the Pockels cell produced in this way, since a simple layer of fluorinated polymer replaces indexing liquids and casings traditionally used for such cells.

In effect, the layer of fluorinated polymer according to the invention constitutes excellent protection for the substrate against moisture. This layer, for example, enables one to extend the use of the KDP crystal which may or may not be deuterated, by several months in a Pockels cell compared with a Pockels cell of the prior art.

In addition, the layer of fluorinated polymer confers on the Pockels cell, a transmission greater than 98%. This constitutes an improvement of 6 to 7% compared with an untreated KDP crystal and therefore low insertion losses in an amplifier.

Similar and indeed greater transmissions have been observed for a silicate substrate.

The layer of fluorinated polymer also confers on the substrate, for example a crystal of KDP or a silicate glass, excellent resistance to a laser flux and it is not damaged by a flux greater than 25 J/cm$^2$ at 1053 nm and greater than 15 J/cm$^2$ at 351 nm under a nanosecond regime.

As a consequence, a material according to the invention is suitable for use in a power laser.

The invention will be better understood on reading the following description of a preferred embodiment, given by way of an illustrative example which is non-limitative and makes reference to the single appended Figure.

DESCRIPTION OF THE FIGURE

The single FIGURE is a comparative graph representing the optical transmissions of a bare KDP crystal, a KDP crystal comprising a porous sol-gel layer and a KDP crystal comprising a layer of fluorinated polymer, as a function of the incident wavelength in nm.

EXAMPLES OF EMBODIMENTS OF THE INVENTION

Example of an Antiglare Treatment of a Phosphate Substrate by the Method of the Invention In this example, a crystal of KDP is treated by the method of the invention.

Before deposition of the antiglare film, the KDP is cleaned by immersing it in a bath of kerosene and then toluene. Next it is rinsed with tetrachloro-ethylene and then wiped with soft optical paper.

For the antiglare treatment according to the invention, the fluorinated polymer used is a copolymer derived from polytetrafluoroethylene (PTFE) obtained by polymerization of 2,2-bistrifluoromethyl-4,5-difluoro-1,3-dioxole with tetrafluoroethylene. It is prepared from a product sold by the company Du Pont of Nemours under the registered trade mark TEFLON AF 1600.

This fluorinated polymer is dissolved at a concentration of 4% by weight in a perfluorinated solvent with the trade mark FLUORINET, series FC from the company 3M, in order to form a deposition solution.

This deposition solution is filtered before use using polypropylene filters from the company Whatman (registered trade mark).

The deposition of the deposition solution onto the KDP crystal is carried out by dipping-withdrawing in a class 1000 clean room. After deposition, the layer of fluorinated polymer is dried at ambient temperature and a material is obtained that has antiglare properties according to the invention, consisting of a KDP crystal and the layer of fluorinated polymer.

The layer of polymer obtained is dense and hydrophobic, and it can be wiped without suffering damage. It has the advantage of being resistant to being peeled off (standard adhesive tape test US-MIL-A-AA-113B).

Optical transmission measurements as a function of wavelength in nm are carried out on the KDP crystal onto the surface of which, a layer of fluorinated polymer is deposited according to the invention (KDP+fluorinated polymer), and for comparison purposes, on a KDP crystal, onto the surface of which a sol-gel layer is deposited according to the prior art (KDP+sol-gel) and on a bare KDP crystal.

The results of these measurements have been reported in the single appended Figure. Curve 1 corresponds to the optical transmission measurements on the KDP crystal+fluorinated polymer, according to the invention, curve 3 corresponds to the optical transmission measurements on the KDP crystal+sol-gel of the prior art and curve 5 corresponds to the optical transmission measurements on the bare KDP crystal.

Used as an antiglare coating on vitreous substrates, said treatment enables one to considerably simplify cleaning by its dirt repellent and rain repellent effect, while at the same time guaranteeing maximum optical transmission, greater than or equal to 99%, representing an improvement of 6 to 7% in comparison with the untreated substrate.

Furthermore, the treatment according to the invention provides an antiglare layer having exceptional hydrophobic and oleophobic properties with a contact angle greater than 90°.

What is claimed is:

1. Method for treating a phosphate substrate for forming a removable antireflective film consisting essentially of depositing a single layer composed of a fluorinated polymer with a low refractive index within a range of between about 1.2 to 1.4 onto said substrate and drying same with both steps being performed at or about ambient temperature.

2. Method according to claim 1, in which the fluorinated polymer is a derivative of polytetrafluoroethylene at a concentration of from 0.1 to 10% by weight in the deposition solution.

3. Method according to claim 2, in which the deposition solution comprises a perfluorinated solution selected from the group consisting of a perfluoroalkylamine, a perfluoropolyether, and a perfluoroalkane, and the derivative of polytetrafluoroethylene is a fluorinated polymer arising from the copolymerization of a mixture of tetrafluoroethylene and 2,2-bistrifluoromethyl-4,5-difluoro-1,3-dioxole.

4. Method according to claim 1, in which the fluorinated polymer is a derivative of polytetrafluoroethylene at a concentration of from 2 to 5% by weight in the deposition solution.

5. Method according to claim 4, in which the deposition solution comprises a perfluorinated solution selected from the group consisting of a perfluoroalkylamine, a perfluoropolyether, and a perfluoroalkane, and the derivative of polytetrafluoroethylene is a fluorinated polymer arising from the copolymerization of a mixture of tetrafluoroethylene and 2,2-bistrifluoromethyl-4,5-difluoro-1,3-dioxole.

6. Method according to claim 1, in which the phosphate substrate is selected from the group consisting of a phosphate glass and a crystal of potassium dihydrogen phosphate.

7. Method according to claim 6, in which the potassium dihydrogen phosphate crystal is deuterated.

* * * * *